US012227066B2

(12) United States Patent
Nakaya et al.

(10) Patent No.: US 12,227,066 B2
(45) Date of Patent: Feb. 18, 2025

(54) FUEL TANK

(71) Applicant: YACHIYO INDUSTRY CO., LTD., Saitama (JP)

(72) Inventors: Kazunari Nakaya, Tochigi (JP); Masaki Morisaki, Tochigi (JP); Kazuyoshi Morooka, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 18/290,911

(22) PCT Filed: Jul. 11, 2022

(86) PCT No.: PCT/JP2022/027272
§ 371 (c)(1),
(2) Date: Jan. 22, 2024

(87) PCT Pub. No.: WO2023/008162
PCT Pub. Date: Feb. 2, 2023

(65) Prior Publication Data
US 2024/0262183 A1 Aug. 8, 2024

(30) Foreign Application Priority Data
Jul. 26, 2021 (JP) ................................ 2021-121190

(51) Int. Cl.
*B60K 15/03* (2006.01)

(52) U.S. Cl.
CPC .................. *B60K 15/03177* (2013.01); *B60K 2015/03046* (2013.01)

(58) Field of Classification Search
CPC .......... B60K 2015/03453; B60K 2015/03046; B60K 2015/0346; B29C 65/56
See application file for complete search history.

(56) References Cited

U.S. PATENT DOCUMENTS

2002/0007896 A1* 1/2002 Huber ................ B29C 66/2272 156/159
2012/0152449 A1* 6/2012 Watanabe .............. B29C 51/12 156/245

(Continued)

FOREIGN PATENT DOCUMENTS

CN 104986033 A 10/2015
CN 107531144 A 1/2018

(Continued)

OTHER PUBLICATIONS

Written Opinion dated on Sep. 20, 2022 and the International Preliminary Report dated Feb. 28, 2023 for PCT/JP2022/027272.

(Continued)

*Primary Examiner* — Stephen J Castellano
(74) *Attorney, Agent, or Firm* — KENEALY VAIDYA LLP

(57) ABSTRACT

A fuel tank includes an internal component having a head portion, a neck portion, and a shoulder portion, in which the internal component is fixed on a tank main body by shaping a parison to the head portion, the neck portion and the shoulder portion during molding of the tank main body. Here, in the fuel tank, the head portion has a rotation-stopping shape. The rotation-stopping shape is preferably an elliptical shape or an oval shape. Further, the rotation-stopping shape is preferably a broad bean shape.

3 Claims, 11 Drawing Sheets

(56) References Cited

U.S. PATENT DOCUMENTS

| | | | |
|---|---|---|---|
| 2018/0079299 | A1 | 3/2018 | Tsukahara |
| 2020/0384855 | A1 | 12/2020 | Kye et al. |
| 2023/0001784 | A1 | 1/2023 | Nakaya et al. |

FOREIGN PATENT DOCUMENTS

| | | | |
|---|---|---|---|
| CN | 209833358 | U | 12/2019 |
| CN | 110774890 | A | 2/2020 |
| CN | 211764909 | U | 10/2020 |
| EP | 3284625 | A1 | 2/2018 |
| JP | 2002-264671 | A | 9/2002 |
| JP | 2006-224991 | A | 8/2006 |
| JP | 2013060096 | A | 4/2013 |
| JP | 2014-043064 | A | 3/2014 |
| JP | 2015205552 | A | 11/2015 |
| JP | 2020-063734 | A | 4/2020 |
| KR | 101512932 | B1 | 4/2015 |
| KR | 20190073658 | A | 6/2019 |
| KR | 102187051 | B1 | 12/2020 |
| WO | 2018/225413 | A1 | 12/2018 |
| WO | 2021/010172 | A1 | 1/2021 |
| WO | 2021090937 | A1 | 5/2021 |

OTHER PUBLICATIONS

Office Action for the corresponding Chinese patent application No. 202280049303.5 dated Apr. 9, 2024.

Office Action for the corresponding Japanese patent application No. 2023-538404 dated Mar. 12, 2024.

* cited by examiner

FUEL TANK

CROSS-REFERENCE TO RELATED APPLICATION

This application is a U.S. National Stage Application under 35 U.S.C. § 371 of International Patent Application No. PCT/JP2022/027272 filed on Jul. 11, 2022, which claims the benefit of priority to Japanese Patent Application No. 2021-121190 filed on Jul. 26, 2021, the disclosures of all of which are hereby incorporated by reference in their entireties.

TECHNICAL FIELD

The present invention relates to a fuel tank.

BACKGROUND ART

A recognized method exists for affixing components, such as valves, to blow-molded products, notably automobile fuel tanks, as internal components. For example, Patent Literature 1 describes a method for manufacturing a fuel tank that integrates an internal component, which includes a head portion, neck portion, and shoulder portion. Within this method of fuel tank fabrication, a parison is shaped along the neck portion by sending air from the exterior of the parison during the tank main body molding process, thus anchoring the internal component to the tank main body.

CITATION LIST

Patent Document

Patent Document 1: International Publication No. WO2018/225413

SUMMARY OF INVENTION

Technical Problem

In the invention according to Patent Document 1, the circular configuration of the head portion results in a tendency for the internal component to undergo rotational movement in the circumferential direction of the head portion subsequent to parison molding. Such rotation of the internal component after parison molding can pose a risk of instability within main the tank body, potentially compromising the strength thereof.

The present invention has been devised from such a perspective and aims to provide a fuel tank in which the internal component is difficult to rotate after parison molding.

Solution to Problem

To achieve the aforementioned object, the present invention is a fuel tank which includes an internal component including a head portion, a neck portion, and a shoulder portion, the internal component being fixed on a tank main body by shaping a parison to the head portion, neck portion, and shoulder portion during molding of the tank main body molding. In the internal component, the head portion, the neck portion and the shoulder portion are respectively formed at both ends of a columnar torso portion. The shoulder portion is formed larger than the head portion and the neck portion. The head portion and the neck portion are embedded in opposing internal surfaces of the tank main body by wrapping the parison around the neck portion during molding of the internal component. Herein, the head portion has a rotation-stopping shape.

According to the present invention, since the head portion of the internal component has a rotation-stopping shape, it is possible to suppress the rotation of the internal component after parison molding.

Also, the rotation-stopping shape is preferably an elliptical shape, oval shape, or broad bean shape. Further, the head portion, the neck portion and the shoulder portion are similar, and the rotation-stopping shape is preferably a broad bean shape.

According to the present invention, the rotation of the internal component can be effectively and suitably suppressed.

Advantageous Effects of Invention

According to the present invention, it aims to provide a fuel tank in which the internal component is difficult to rotate after parison molding.

BRIEF DESCRIPTION OF DRAWINGS

FIG. 8A shows the injection process of the parison, FIG. 8B shows the insertion process of the internal component, and FIG. 8C shows the temporary setting process of the internal component.

FIG. 9A shows the closing process of the mold, FIG. 9B shows the blow molding process, FIG. 9C shows the cooling process of the parison, and FIG. 9D shows the opening process of the mold.

DESCRIPTION OF EMBODIMENTS

First Embodiment

<<Fuel Tank According to Embodiment>>

Figure 1:
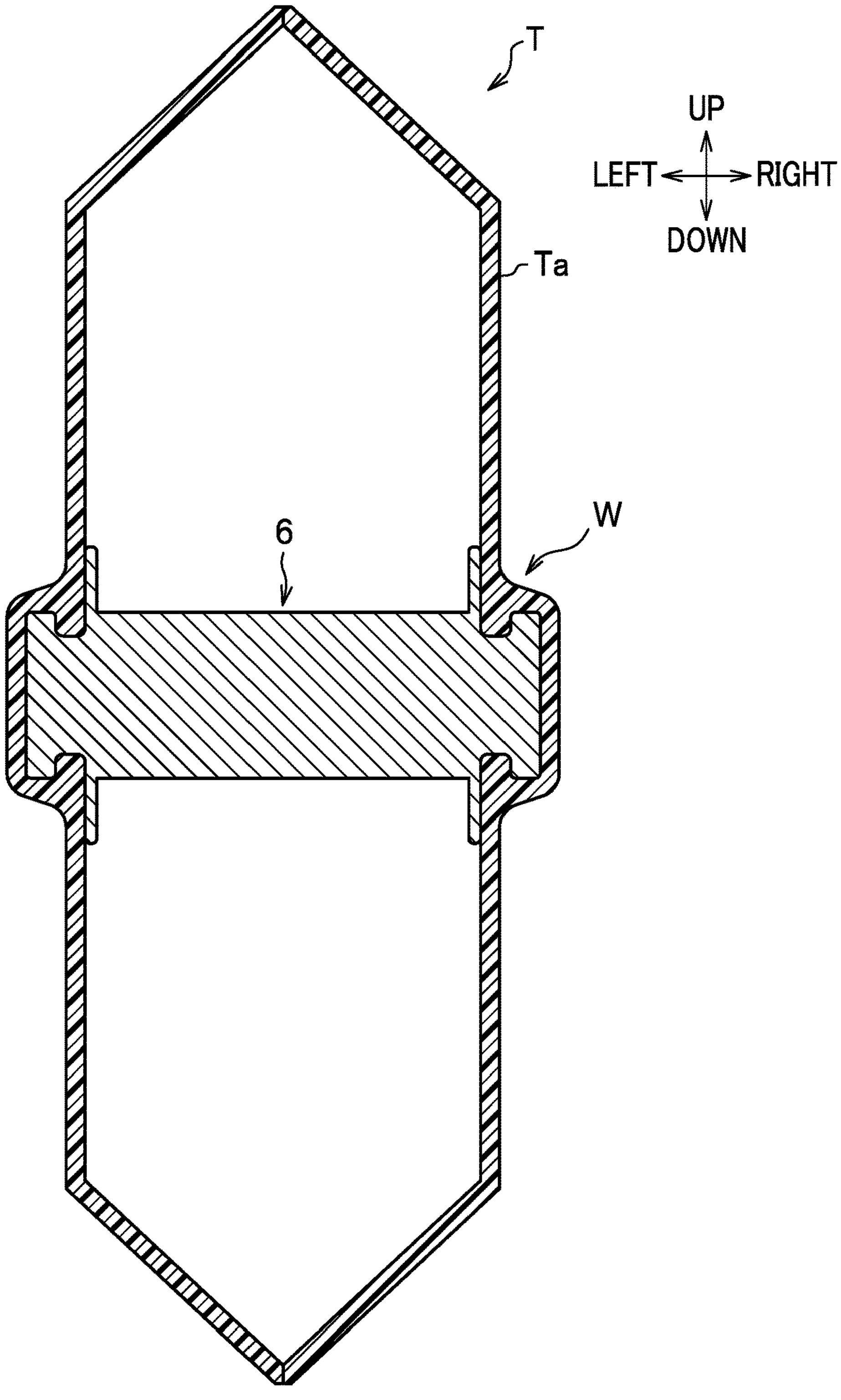
FIG. 1 is a schematic cross-sectional view of a fuel tank according to the first embodiment of the present invention.

The fuel tank T shown in FIG. 1 is intended for installation in vehicles such as automobiles, motorcycles, and boats, and mainly includes a tank main body Ta and an internal component 6. As shown in FIG. 1, the present embodiment exemplifies a columnar reinforcement member as the internal component 6 to maintain the strength of the fuel tank T, but the internal component 6 can also be a valve or a wave damping plate. The terms "up and down" and "left and right" in the following description refer to the arrows in FIG. 1. Each direction is defined for the convenience of the description and does not limit the present invention. The left and right directions in FIG. 1 correspond to the opening and closing directions of a pair of molds used to manufacture the fuel tank T.

The tank main body Ta is a hollow container made of resin for storing fuels such as gasoline, and has a multilayered structure that includes a barrier layer, for example. The tank main body Ta is primarily made of thermoplastic resin such as polyethylene or high-density polyethylene. The tank main body Ta is formed, for instance, by blow molding.

In reference to FIGS. 2 to 4, the configuration of the internal component 6 will be described. A parison S which is a precursor of the tank main body Ta (see FIG. 5) has a multilayered structure of made HDPE (high-density polyethylene), EVOH (ethylene-vinyl alcohol copolymer), adhesive layers, and the like.

Figure 2:
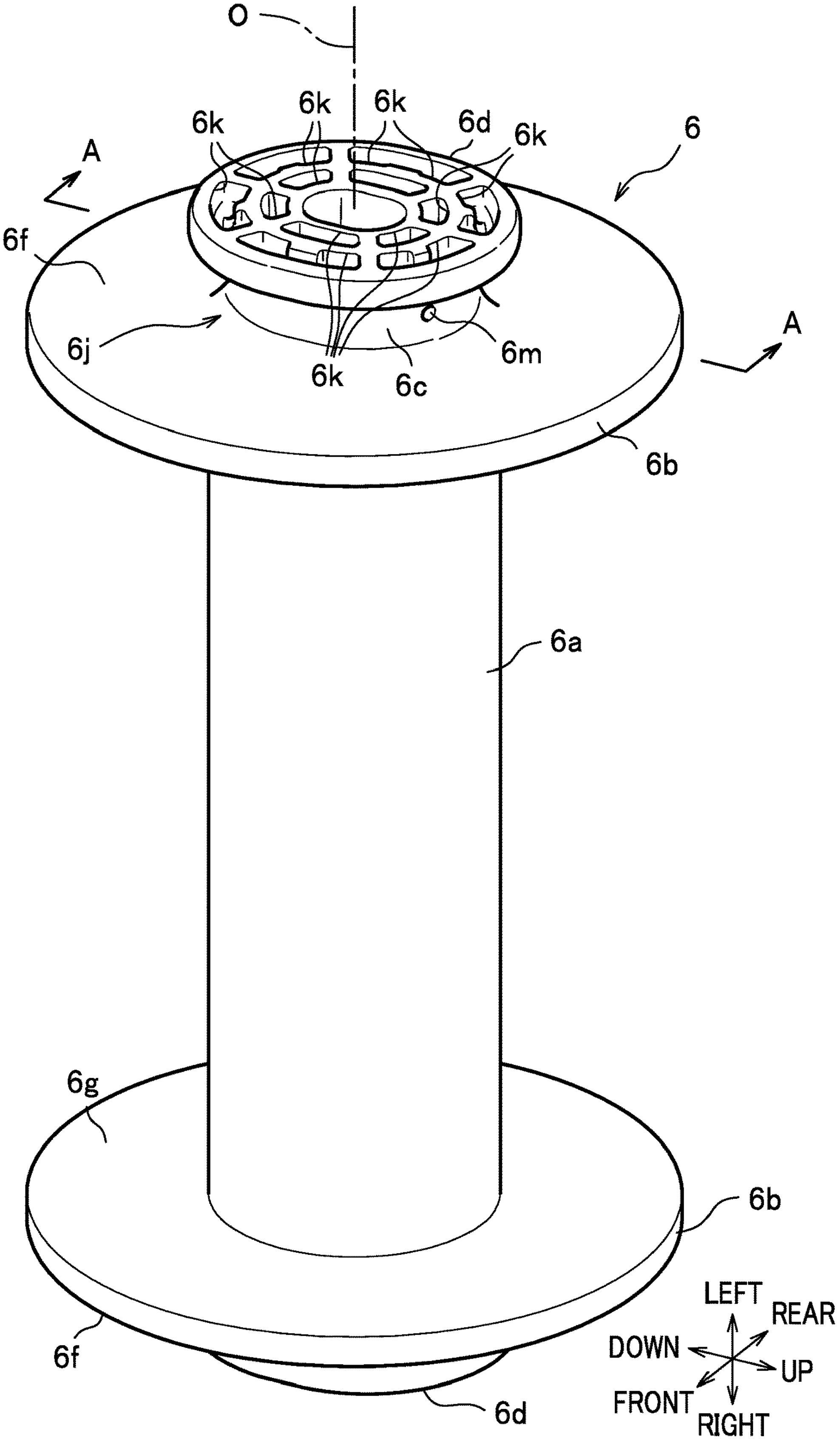
FIG. 2 is an external perspective view of an internal component according to the first embodiment of the present invention.

As shown in FIG. 2, the internal component 6 includes a cylindrical torso portion 6*a*, shoulder portions 6*b*, 6*b* formed at both left and right ends of the torso portion 6*a*, neck portions 6*c*, 6*c* formed at the left and right outsides of the shoulder portions 6*b*, 6*b*, and head portions 6*d*, 6*d*. The structure of the internal component 6 is symmetrical in left and right (up and down on the paper). Therefore, unless explicitly stated, only one side will be described here. In the description of the internal component 6, the surface facing the torso portion 6*a* is referred to as the "back surface," and the surface opposite to the "back surface" is referred to as the "front surface."

The torso portion 6*a* shown in FIG. 2 is a part configured to be the main body of the internal component 6. Multiple hollowing holes may be formed in the torso portion 6*a*. These hollowing holes (not shown) are formed to reduce weight and improve moldability, as well as increase the capacity of the fuel tank T (see FIG. 1).

Figure 5:
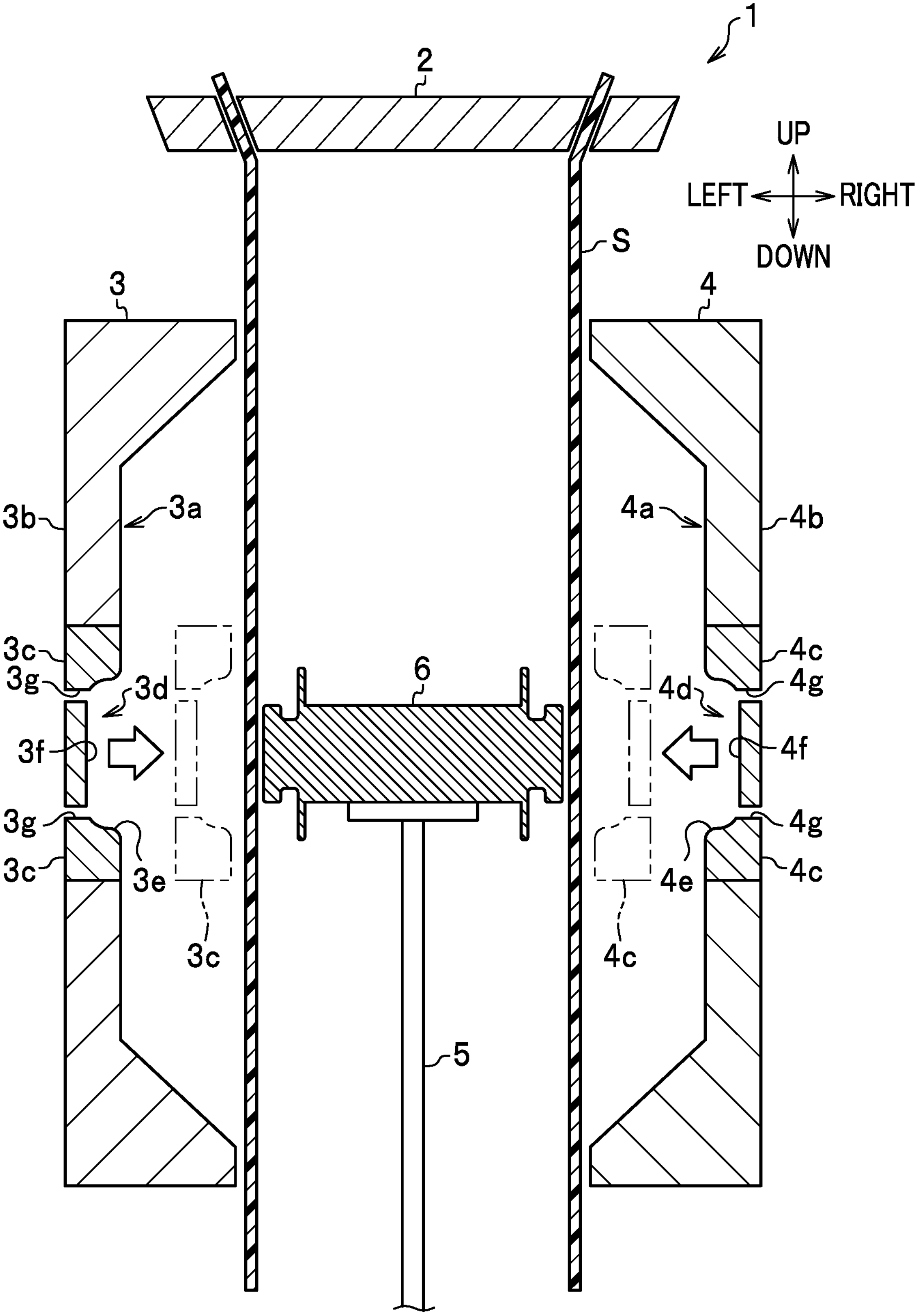
FIG. 5 is a schematic longitudinal cross-sectional view of a fuel tank manufacturing device.

The shoulder portion 6*b* shown in FIG. 2 covers the recess 3*d* of the first mold 3 or the recess 4*d* of the second mold 4, shown in FIG. 5. The shape and size of the shoulder portion 6*b* are not particularly limited, as long as they can cover the recesses 3*d*, 4*d*. Here, the shoulder portion 6*b* has a thin circular plate shape, and as shown in FIG. 3, the outer diameter rb of the shoulder portion 6*b* is larger than the outer diameter ra of the torso portion 6*a*.

Figure 3:
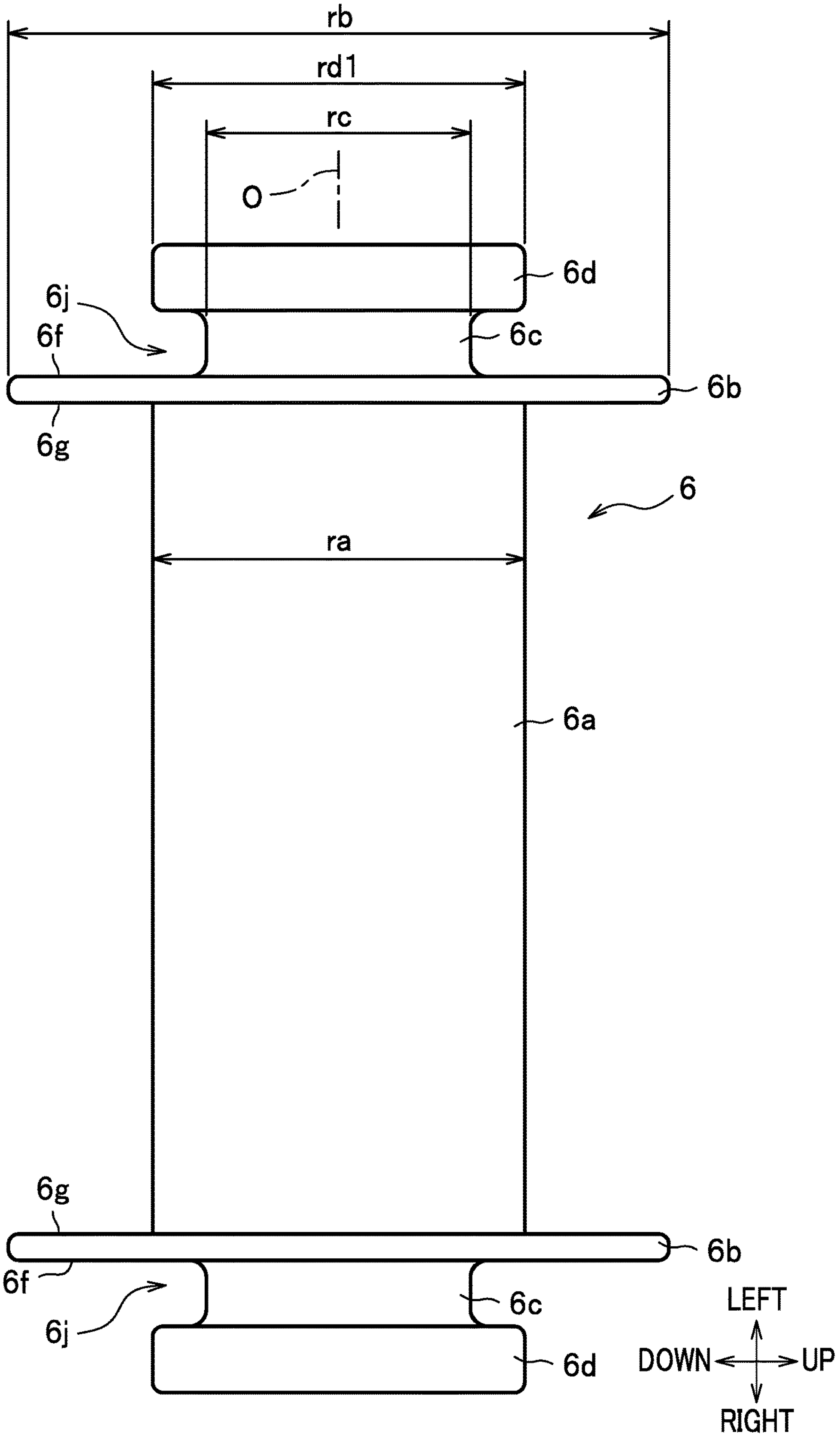
FIG. 3 is a front view of the internal component according to the first embodiment of the present invention.
Figure 4:
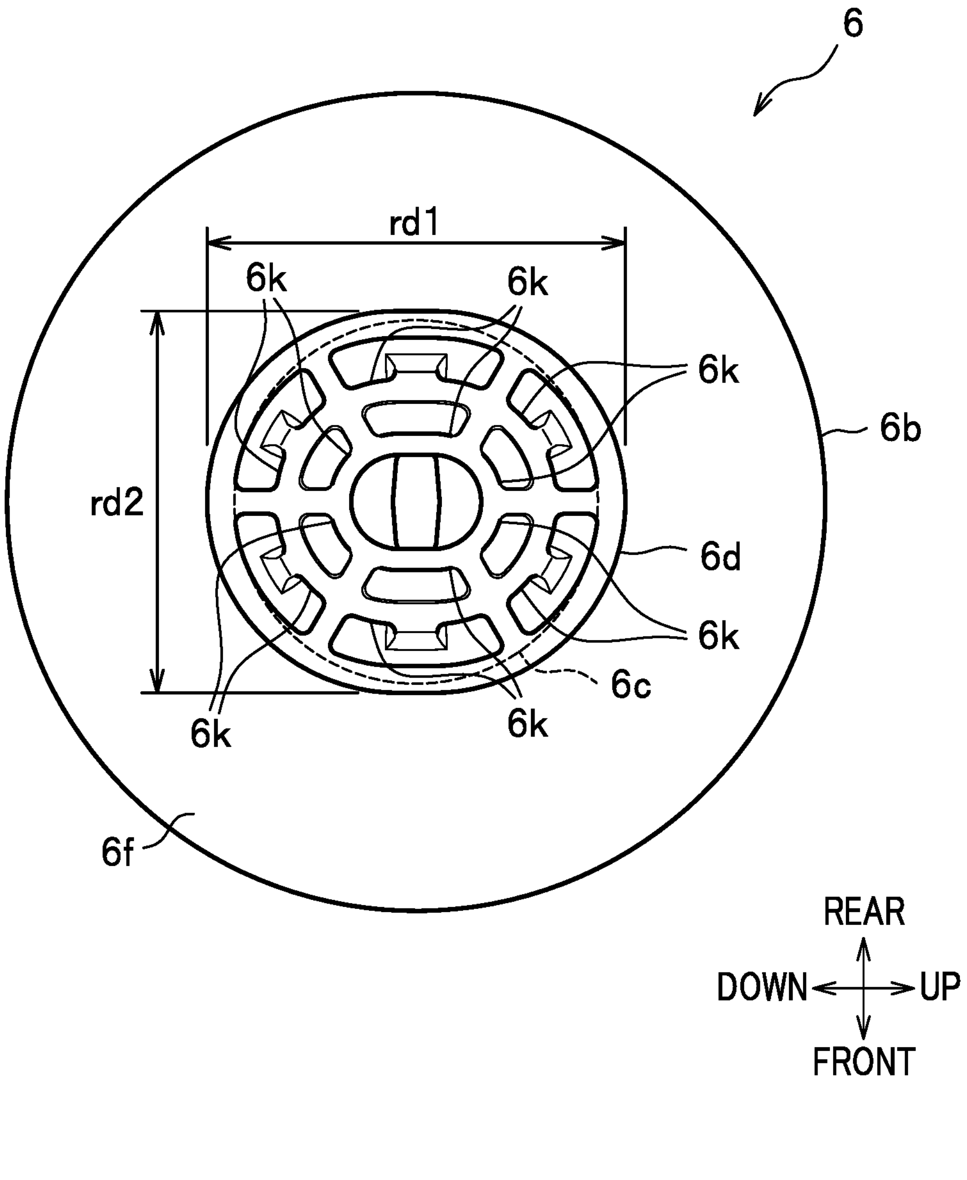
FIG. 4 is a plan view of the internal component according to the first embodiment of the present invention.

The neck portion 6*c* shown in FIG. 2 is a portion connecting the shoulder portion 6*b* and the head portion 6*d*, and as shown in FIG. 3, the neck portion 6*c* has a smaller diameter than the shoulder portion 6*b* and the head portion 6*d*. The neck portion 6*c* here stands from the surface 6*f* of the shoulder portion 6*b* and has a cylindrical shape. Rounded corners (radii) are formed in the corner portions formed by the shoulder portion 6*b* and the neck portion 6*c*, and in the corner portions formed by the head portion 6*d* and the neck portion 6*c*.

The head portion 6*d* shown in FIG. 2 has a shape of a thick circular plate, which is thicker than the shoulder portion 6*b*. However, the relationship in thickness between the shoulder portion 6*b* and the head portion 6*d* here is merely illustrative, and the shoulder portion 6*b* can also be formed thicker than the head portion 6*d*. As shown in FIG. 3, the outer diameter rd1 of the head portion 6*d* is larger than the outer diameter rc of the neck portion 6*c* and smaller than the outer diameter rb of the shoulder portion 6*b*. Due to this shape, a gap 6*j* is formed between the shoulder portion 6*b* and the head portion 6*d*, with the neck portion 6*c* as the bottom portion. The gap 6*j* is a portion where the parison S enters during molding. The part corresponding to the parison S wrapped around the neck portion 6*c* will be referred to as the "parison equivalent portion W" (see FIG. 7).

The shape of the head portion 6*d* has a rotation-stopping shape to prevent the internal component 6 from rotating along the circumferential direction of the head portion 6*d*. This rotation-stopping shape, as shown in FIG. 4, has an elliptical shape or substantially elliptical shape in the present embodiment. An outer diameter rd1 of the head portion 6*d* in the vertical direction is larger than an outer diameter rd2 of the head portion 6*d* in the horizontal direction.

The term rotation-stopping shape implies such a shape that after the internal component 6 is shaped onto the tank main body Ta, the internal component 6 will not rotate relative to the tank main body Ta. In the present embodiment, by making a difference in diameter between the outer diameter rd1 and the outer diameter rd2 of the head portion 6*d*, the rotation of the internal component 6 is restrained. The rotation-stopping shape can also be, for example, an oval shape. The oval shape includes, for instance, an elongated circle shape, a flattened circle shape, or a rectangle with rounded corners.

<<Method for Manufacturing Fuel Tank According to Embodiment>>

The fuel tank manufacturing device 1 shown in FIG. 5 is a device that blow-molds a cylindrical parison S to produce a fuel tank T having an internal component 6 (see FIG. 1). Additionally, the fuel tank T can also be manufactured by molding a sheet-shaped parison (not shown).

As shown in FIG. 5, the fuel tank manufacturing device 1 mainly includes a die 2, a pair of first mold 3 and second mold 4, and an elevator 5 that moves up and down between the first mold 3 and the second mold 4.

The die 2 is located above the first mold 3 and second mold 4 and is a supply means for supplying the parison S to the first mold 3 and second mold 4. The parison S has a multilayered structure composed of HDPE (high-density polyethylene), EVOH (ethylene-vinyl alcohol copolymer), adhesive layers, and the like, and is a precursor of the tank main body Ta that constitutes the fuel tank T (see FIG. 1).

Figure 7:
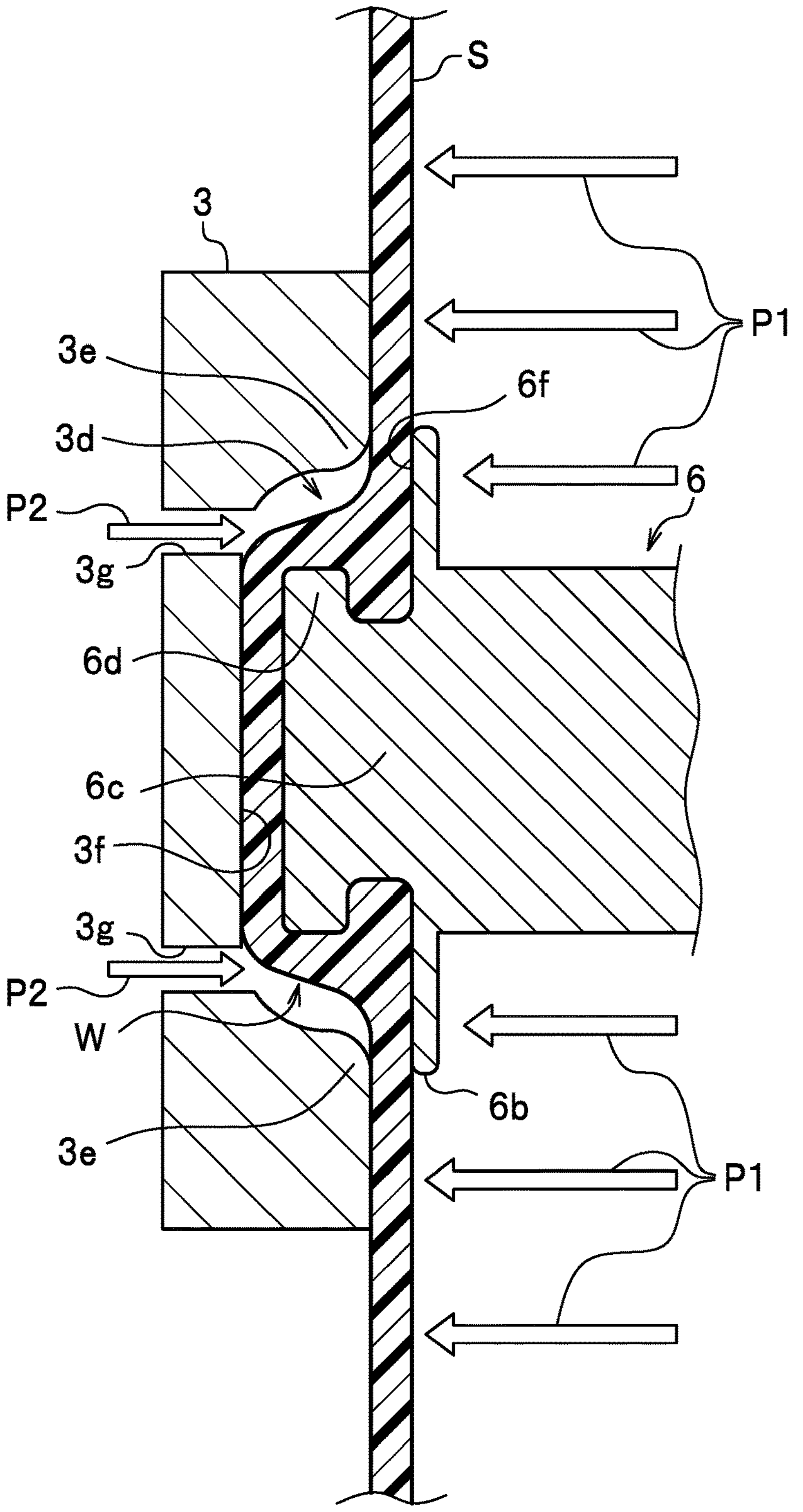
FIG. 7 is a diagram for explaining the transfer status of the parison around the end portion of the internal component during molding.

The first mold 3 and second mold 4 shown in FIG. 5 are molding means for compression-molding the fuel tank T (see FIG. 1). The first mold 3 and second mold 4 are arranged facing each other, and concave molding portions 3*a*, 4*a* are formed on their opposing surfaces. The first mold 3 and second mold 4 can open and close by moving in the left-right direction, and the parison S is supplied when the first mold 3 and the second mold 4 are in an open state (state as shown in FIG. 7). Also, the first mold 3 and second mold 4 include not-shown blow pins to send air into the first mold 3 and second mold 4, and the air pressure (blow pressure) inside the first mold 3 and second mold 4 is properly adjusted by a not-shown first positive pressure applying means. This first positive pressure applying means allows for transfer of the parison S to the molding portions 3*a*, 4*a*.

The first mold 3 is constructed to separate, and includes a main body portion 3*b* and a separable portion 3*c* that can be detached from the main body portion 3*b*. Similarly, the second mold 4 is constructed to separate, and includes a main body portion 4*b* and a separable portion 4*c* that can be detached from the main body portion 4*b*. The separable portions 3*c*, 4*c* are provided with recesses 3*d*, 4*d* formed therein, which correspond to the shapes of both ends of the internal component 6, and these recesses 3*d*, 4*d* accommodate a part of the internal component 6. The recesses 3*d*, 4*d* here have a cylindrical shape. Additionally, in the bottom portions 3*f*, 4*f* of the recesses 3*d*, 4*d*, multiple air holes 3*g*, 4*g* are formed to send air into the recesses 3*d*, 4*d*, respectively, and the air pressure (blow pressure) inside the recesses 3*d*, 4*d* is properly adjusted by a not-shown second positive pressure applying means.

The elevator 5 is a moving means for moving the internal component 6 to its installation position. The installation position here is inside the cylindrical parison S, and is between the separable portions 3*c*, 4*c*.

Next, the operation of the fuel tank manufacturing device 1 will be described. Before explaining the entire process of manufacturing the fuel tank T (see FIG. 1) by the fuel tank manufacturing device 1, the transfer status around the end portions of the internal component 6 will be described.

<Transfer Status Around End Portions of Internal Component>

In reference to FIGS. 6 and 7 (and FIGS. 1 to 4 as appropriate), the transfer status of the parison S around the end portions of the internal component 6 during molding will be described. Note that here, the first mold 3 will be described because the second mold 4 is similar to the first mold 3. The internal component 6 shown in FIGS. 6 and 7 shows cross-sections cut at the A-A position in FIG. 2.

Figure 6:
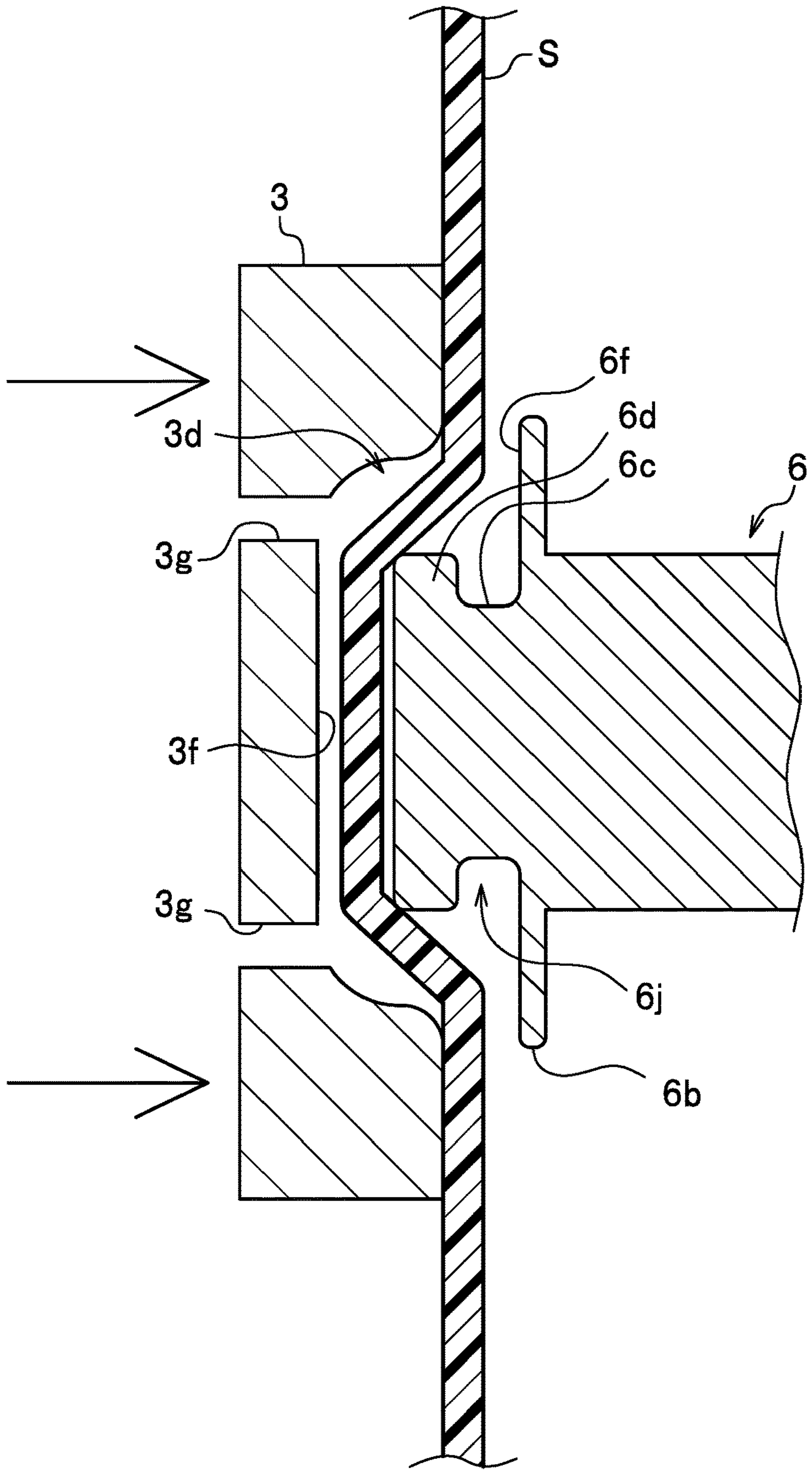
FIG. 6 is a diagram for explaining the transfer status of the parison around the end portion of the internal component during molding.

In the fuel tank manufacturing process, as shown in FIG. 6, by moving the first mold 3 in the arrow direction and clamping the parison S, the neck portion 6*c* and head portion 6*d* of the internal component 6 are pushed into the recess 3*d* together with the parison S.

As shown in FIG. 7, when the shoulder portion 6*b* contacts the parison S to cover the opening of the recess 3*d*, and the neck portion 6*c* and head portion 6*d* are completely pushed into (housed in) the recess 3*d*, a positive pressure P1 (first positive pressure) is generated inside the parison S by sending air into the first mold 3, transferring the parison S to the first mold 3. In addition, by sending air into the recess 3*d* through the air holes 3*g* formed in the recess 3*d*, a positive pressure P2 (second positive pressure) is generated inside the recess 3*d* to allow the parison S to enter the gap 6*j* between the shoulder portion 6*b* and the head portion 6*d* for transfer. The air in the gap 6*j* is discharged from the communication portions 6*m* formed in the neck portion 6*c* through the cutout portion 6*k* to the torso portion 6*a*.

Next, the overall process of the fuel tank manufacturing device 1 will be described.

<Parison Injection Process>

Figures 8A, 8B, 8C:
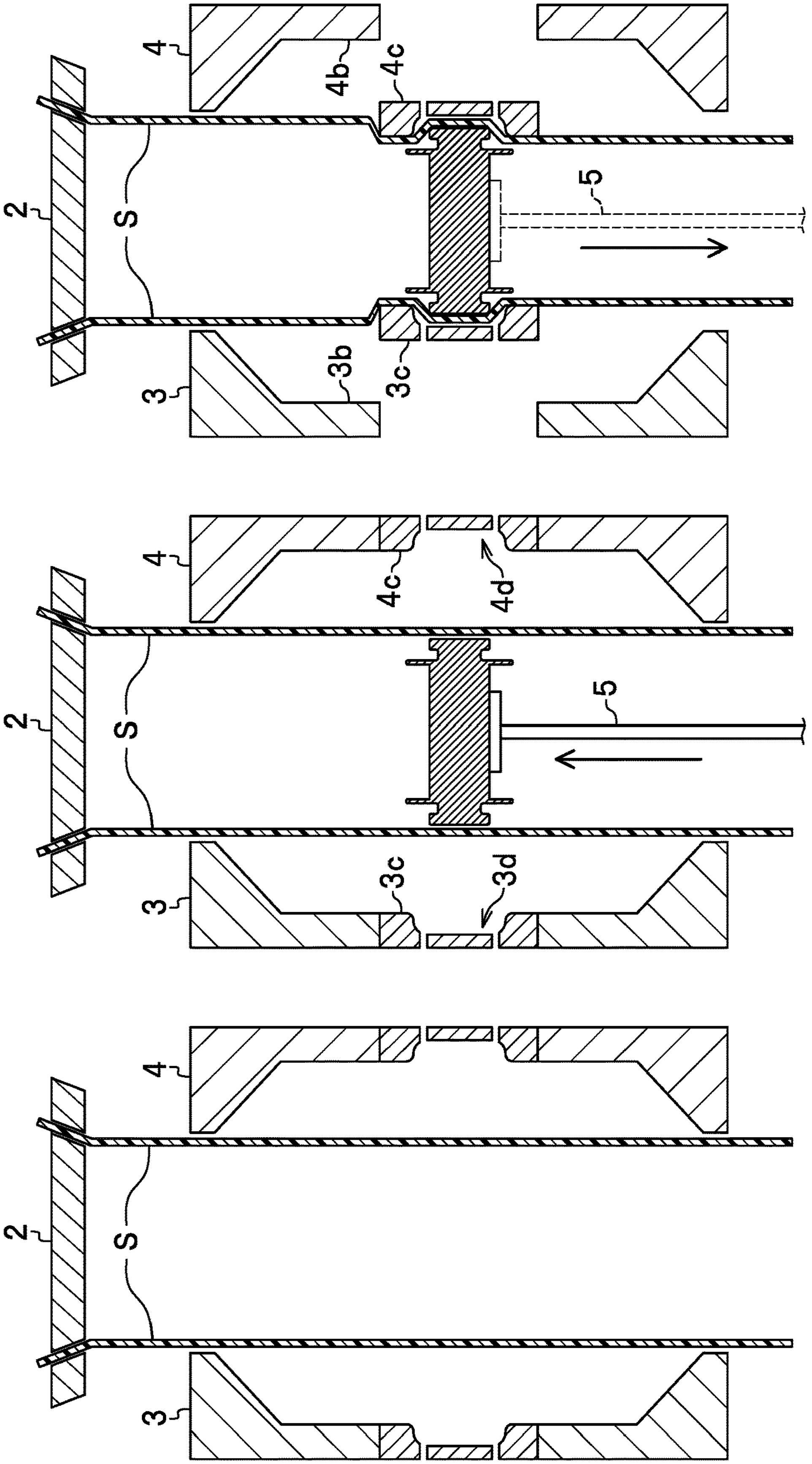
FIGS. 8A to 8C are each a diagram for explaining the method for manufacturing a fuel tank in the fuel tank manufacturing device, where

As shown in FIG. 8A, with the first mold 3 and second mold 4 opened, the die 2 injects a cylindrical parison S therebetween.

<Internal Component Insertion Process>

Next, as shown in FIG. 8A, the elevator 5 rises with the internal component 6 held, and moves the internal component 6 to the attachment position. Here, the attachment position is inside the parison S and between the separable portions 3*c*, 4*c*.

<Internal Component Temporary Setting Process>

Next, as shown in FIG. 8C, the separable portions 3*c*, 4*c* of the first mold 3 and second mold 4 move in directions facing each other to hold the internal component 6 by sandwiching the component 6 from both ends. Then, the elevator 5 descends with the internal component 6 released and retreats to the initial position. The initial position of the elevator 5 may be any position that does not interfere when the main body portions 3*b*, 4*b* of the first mold 3 and second mold 4 are closed.

<Mold Closing Process>

Figures 9A, 9B, 9C, 9D:
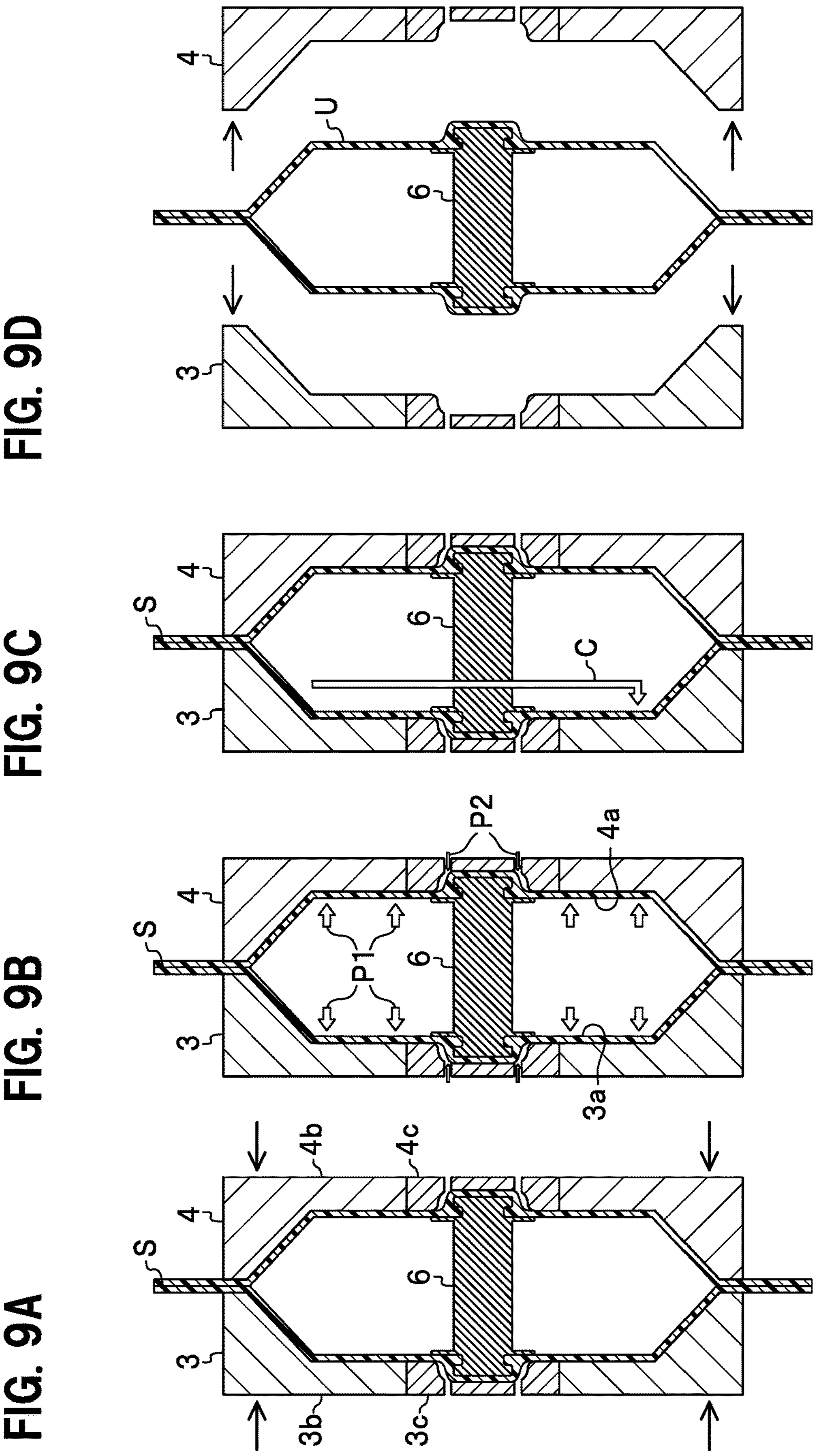
FIGS. 9A to 9D are each a diagram for explaining the method for manufacturing a fuel tank in the fuel tank manufacturing device, where

Next, as shown in FIG. 9A, the main body portions 3*b*, 4*b* of the first mold 3 and second mold 4 move in directions facing each other, and the first mold 3 and second mold 4 are clamped.

<Blow Molding Process>

Next, as shown in FIG. 9B, the not-shown first positive pressure applying means applies a positive pressure P1 (first positive pressure) to the inside of the parison S in the first mold 3 and second mold 4. As a result, the parison S is pressed against and transferred to the molding portions 3*a*, 4*a* of the first mold 3 and second mold 4. Also, the not-shown second positive pressure applying means applies a positive pressure P2 (second positive pressure) to the outside of the parison S in the recesses 3*d*, 4*d* (see FIG. 7) of the first mold 3 and second mold 4. As a result, the parison S is shaped along the neck portion 6*c* of the internal component 6 (see FIG. 7). Note that there is no particular limitation on the method and order of applying the positive pressures P1 and P2. It is preferable that the positive pressure P2 is set higher than the positive pressure P1.

<Parison Cooling Process>

Next, as shown in FIG. 9C, cooling air C is circulated inside the first mold 3 and second mold 4 using not-shown cooling means. As a result, the parison S is cooled and cured.

<Mold Opening Process>

Next, as shown in FIG. 9D, the first mold 3 and second mold 4 are opened and the molded product U is taken out. Then, by cutting off unnecessary burrs formed at both ends, the fuel tank T (see FIG. 1) is completed.

According to the embodiment described above, the internal component 6 attached to the tank main body Ta includes a head portion 6*d*, a neck portion 6*c*, and a shoulder portion 6*b*, and the head portion 6*d* has a rotation-stopping shape to stop the rotation of the internal component 6. Therefore, compared to when the head portion 6*d* is circular, rotation of the internal component 6 can be made more difficult, suppressing rotation of the internal component 6 after parison molding.

Further, since the head portion 6*d* is an elliptical shape, it is easy to design and manufacture the rotation-stopping shape, and rotation of the internal component 6 can be suppressed simply and suitably. Note that in the present embodiment, the shoulder portion 6*b* and neck portion 6*c* are circular and the head portion 6*d* is elliptical or substantially elliptical. However, the shoulder portion 6*b*, neck portion 6*c* and head portion 6*d* may all be made elliptical or substantially elliptical so that they are similar. This improves the moldability of the internal component 6.

Second Embodiment

Figure 10:
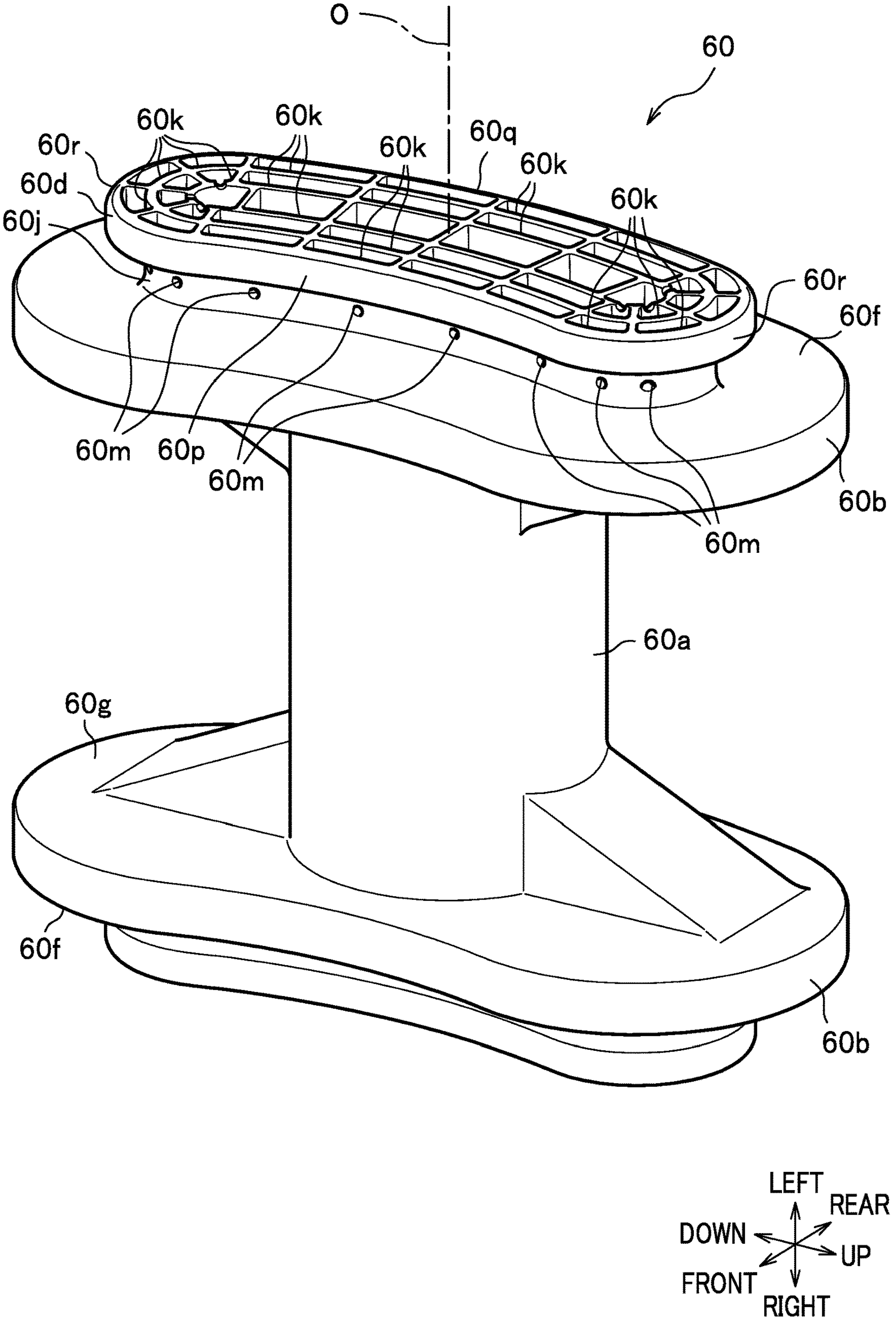
FIG. 10 is an external perspective view of an internal component according to the second embodiment of the present invention.

Next, an internal component 60 according to a second embodiment of the present invention will be described. As shown in FIG. 10, the internal component 60 includes a cylindrical torso portion 60*a*, shoulder portions 60*b*, 60*b* formed at both left and right ends of the torso portion 60*a*, neck portions 60*c*, 60*c* formed at the left and right outsides of the shoulder portions 60*b*, 60*b*, and head portions 60*d*, 60*d*. The structure of the internal component 60 is symmetrical in left and right (up and down on the paper).

Figure 11:
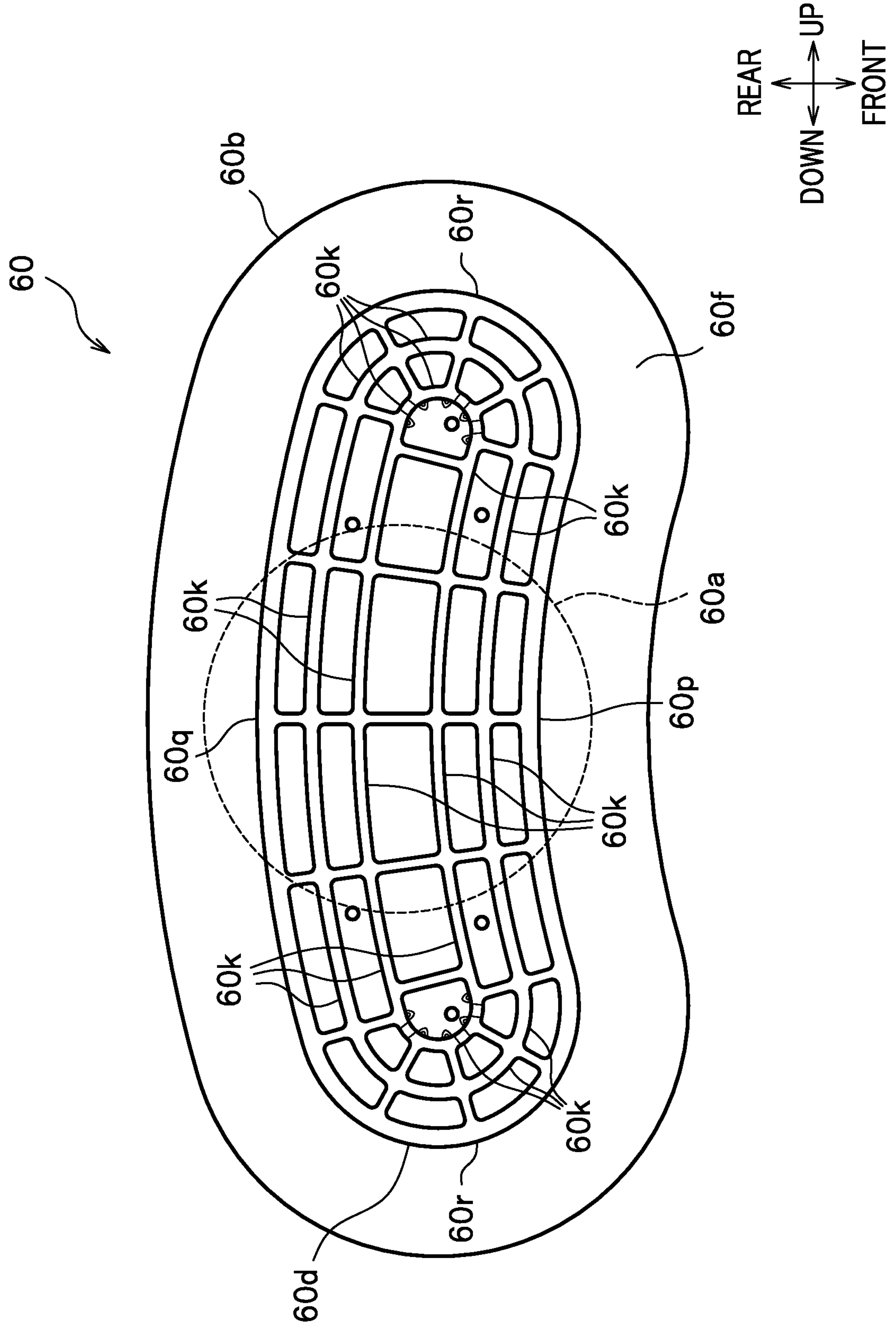
FIG. 11 is a plan view of the internal component according to the second embodiment of the present invention.

In the second embodiment, the rotation-stopping shape is such that the head portion 60*d* has a broad bean shape. Further, corresponding to the shape of the head portion 60*d*, the neck portion 60_c_ and the shoulder portion 60_b_ also have a broad bean shape, and these three portions are similar. As shown in FIG. 11, the head portion 60_d_ includes an arcuate first opposing side 60_p_, an arcuate second opposing side 60_q_, a connecting piece 60_r_ connecting one end side of the first opposing side 60_p_ and second opposing side 60_q_, and a connecting piece 60_r_ connecting the other end side of the first opposing side 60_p_ and second opposing side 60_q_. The first opposing side 60_p_ and second opposing side 60_q_ are formed to be convex in the same direction (rear side). The connecting pieces 60_r_, 60_r_ are formed to be convex in directions away from each other.

As shown in FIG. 11, multiple cutout portions 60_k_ are formed in the head portion 60_d_ and neck portion 60_c_. The cutout portions 60_k_ open at the end surface of the head portion 60_d_ and are hollow from the head portion 60_d_ to the neck portion 60_c_. As in the second embodiment, the rotation-stopping shape of the head portion 60_d_ may be a broad bean shape. The other configurations and effects of the second embodiment are the same as those of the first embodiment, and thus description thereof is omitted.

The embodiments of the invention have been described, but design changes are possible within the scope not departing from the gist of the present invention. Although the parison was made to wrap around the neck portion by positive pressure from outside the parison (blow molding) to fix the internal component, other molding methods may be used for molding.

REFERENCE SIGNS LIST

6, 60 internal component
6_a_ torso portion
6_b_ shoulder portion
6_c_ neck portion
6_d_ head portion
S parison
T fuel tank
Ta tank main body

The invention claimed is:

1. A fuel tank comprising an internal component and a tank main body, wherein, the internal component includes a columnar torso portion and two sets of a head portion, a neck portion and a shoulder portion, the neck portion connecting the shoulder portion and the head portion in each set thereof, the internal component being fixed on the tank main body via said two sets of the head portion, the neck portion and the shoulder portion, wherein one set, of the two sets, of the head portion, the neck portion and the shoulder portion is formed at each end of the torso portion, and the shoulder portion is formed larger than the head portion and the neck portion, especially in a plan view and in a longitudinal direction of the head portion, an outer diameter of the head portion is larger than an outer diameter of the neck portion and smaller than an outer diameter of the shoulder portion, one set, of the two sets, of the head portion and the neck portion is embedded in each of opposing internal surfaces of the tank main body, and each of the head portions has a rotation-stopping shape, wherein in thea plan view of the head portion, the rotation-stopping shape is formed with a difference in diameter between an outer diameter of the head portion in thea longitudinal direction and another outer diameter thereof in a direction orthogonal to the longitudinal direction, the difference in diameter restricts rotation of the internal component relative to the tank main body along a circumferential direction of each of the head portions.

2. The fuel tank according to claim 1, wherein the rotation-stopping shape is an elliptical shape or an oval shape.

3. The fuel tank according to claim 1, wherein the head portion, the neck portion and the shoulder portion are similar in shape, and the rotation-stopping shape is a broad bean shape.

* * * * *